United States Patent [19]
Gormley

[11] Patent Number: 5,247,391
[45] Date of Patent: Sep. 21, 1993

[54] GLARE SHIELD

[76] Inventor: David E. Gormley, Rte. 1 Box 476, Pocola, Okla. 74902

[21] Appl. No.: 863,792

[22] Filed: Apr. 6, 1992

[51] Int. Cl.⁵ .............................................. G02B 27/00
[52] U.S. Cl. ..................................... 359/601; 359/614; 296/97.1; 296/97.7
[58] Field of Search ............... 359/601, 602, 603, 604, 359/608, 609, 614; 296/97.1, 97.6, 97.7, 97.8, 97.9, 97.12, 97.13, 96.2, 96.21, 96.22

[56] References Cited

U.S. PATENT DOCUMENTS

| | | | |
|---|---|---|---|
| 1,920,185 | 8/1933 | Carr, Jr. | 359/614 |
| 2,519,222 | 8/1950 | Brooks | 359/614 |
| 4,758,042 | 7/1988 | Liu | 296/97.7 |
| 4,823,859 | 4/1989 | Park | 296/97.8 |
| 4,842,322 | 6/1989 | Iu | 296/97.7 |
| 4,943,103 | 7/1990 | Rosen | 296/97.1 |

*Primary Examiner*—Loha Ben
*Attorney, Agent, or Firm*—John M. Harrison

[57] ABSTRACT

A glare shield for removably mounting on vehicle windows and other light-reflective surfaces to block the sunlight and reduce glare. The glare shield includes a flat, tinted plate which may be optionally provided with a plate ridge and is fitted with a suction cup and a grip spaced from the suction cup to facilitate rotation of the plate with respect to the suction cup when the suction cup is applied to a vehicle window or other light-reflective surface. A spacer pin projects from the plate and contacts the suction cup to urge the plate in close proximity to the vehicle window or alternative surface.

16 Claims, 1 Drawing Sheet

U.S. Patent     Sep. 21, 1993     5,247,391
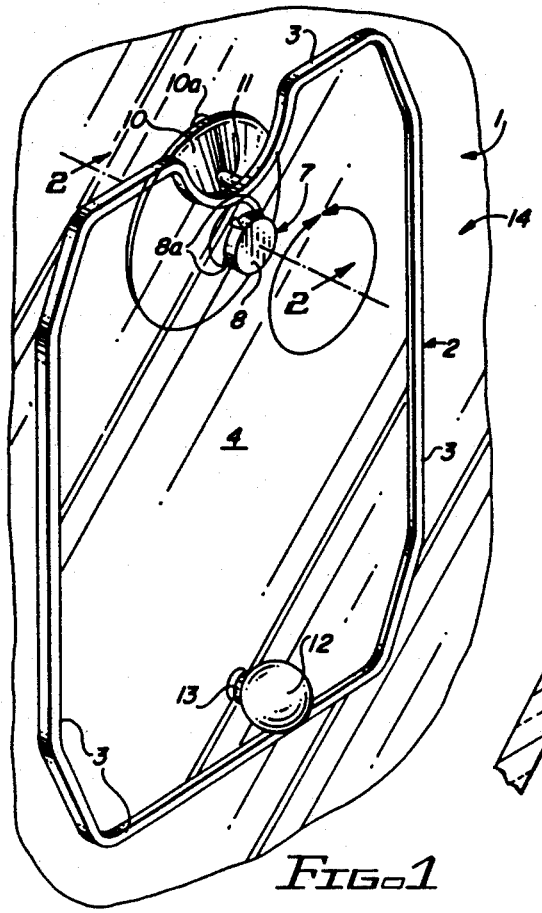
FIG. 1
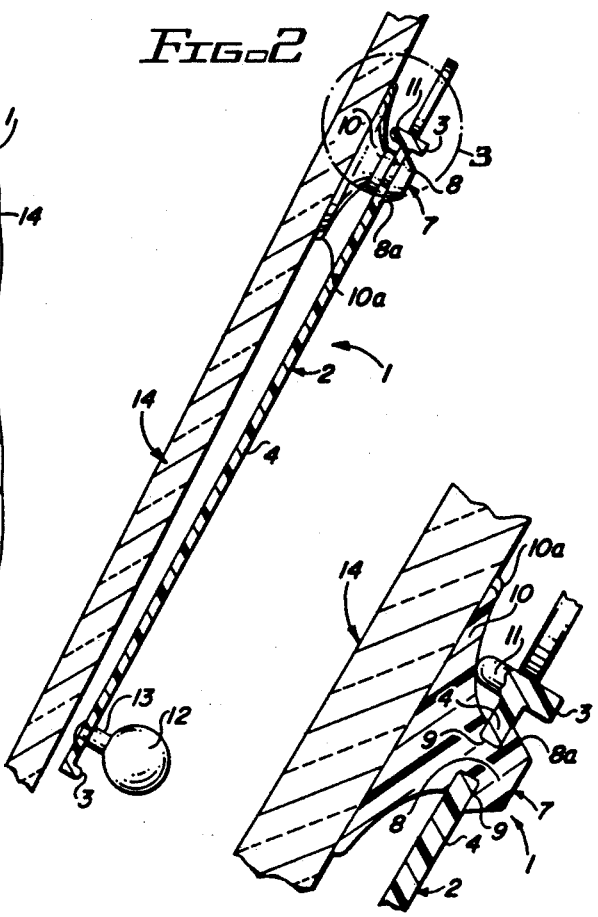
FIG. 2
FIG. 3
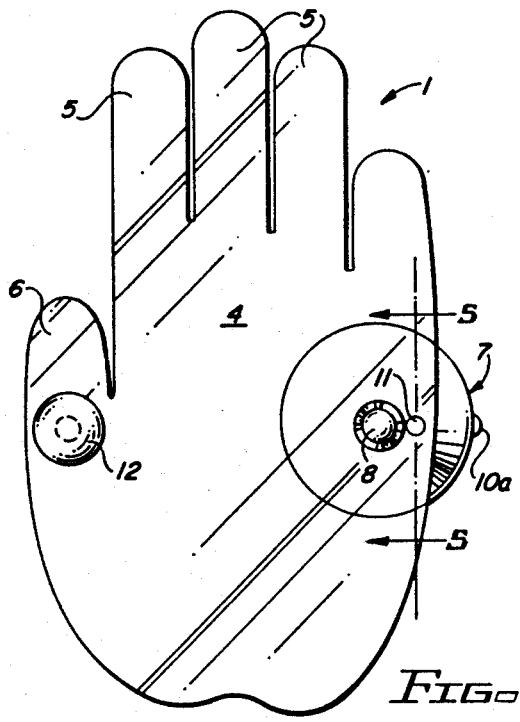
FIG. 4
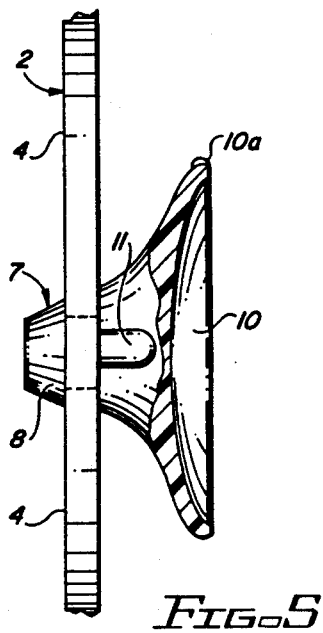
FIG. 5

GLARE SHIELD

BACKGROUND OF THE INVENTION

1. Field of the Invention

This invention relates to sun and glare shields for vehicles and more particularly, to a removable, portable sun and glare shield for positioning on automobile windshields and windows, as well as other light-reflective surfaces, to block the direct rays of the sun and reduce glare in the interior of the vehicle and on the light-reflective surfaces. In a preferred embodiment the sun shield is characterized by a flat, tinted plate which may optionally be provided with a plate ridge and includes a suction cup and a grip for rotating the plate about the suction cup when the suction cup is attached to the windshield or window of a vehicle or other surface. In a most preferred embodiment a spacer pin projects from the plate to the suction cup to bias the plate in close proximity to the windshield or window.

2. Description of the Prior Art

Various screens, plates and other devices are known in the art for shielding the occupants of an automobile from the direct rays and glare of the sun. Typical of these screens is the flexible, tinted plastic screen which is wound into a spring-loaded cylinder secured to a vehicle window, wherein the screen rolls down like a shade to protect the occupants. Similar devices are well known to those skilled in the art.

It is an object of this invention to provide a new and improved sun and glare shield which is portable and easily adjustable to block the rays of the sun through a vehicle windshield or window.

Another object of this invention is to provide a removable glare shield which is fitted with a suction cup for mounting on any smooth surface, such as the window or windshield of a land, water or air vehicle for blocking the sunlight and/or reducing glare from the window or windshield.

Still another object of this invention is to provide a sun and glare shield which may be applied to a windshield window, computer screen or like light-reflective surface to reduce glare and block the direct rays of the sun, which shield includes a tinted, transparent or translucent plate fitted with a suction cup and a grip spaced from the suction cup for rotating the plate about the suction cup.

Yet another object of this invention is to provide a new and improved glare shield for shielding the occupants of a vehicle from the direct rays of the sun and reducing glare in the interior of the vehicle or on a light-reflective surface, which shield includes a flat, transparent or translucent plate of selected shape and dimensions, a suction cup provided near one edge of the shield, a grip provided on the plate in spaced relationship with respect to the suction cup and spacer pin extending from the plate to the suction cup for biasing the plate in close proximity to the window, windshield or other glare-prone surface to which the suction cup is attached.

SUMMARY OF THE INVENTION

These and other objects of the invention are provided in a new and improved sun and glare shield for application to a vehicle window or windshield and reducing the glare and direct impact of the sun's rays, which shield includes a flat, tinted, transparent or translucent plate which may optionally be provided with a rim, a suction cup mounted on the plate near one edge of the plate, a spacer pin extending from the plate to the suction cup for biasing the plate in close proximity to the window or windshield to which the suction cup is applied and a grip or knob provided on the plate in spaced relationship with respect to the suction cup for rotating the plate about the axis of the suction cup.

BRIEF DESCRIPTION OF THE DRAWING

The invention will be better understood by reference to the accompanying drawing, wherein:

FIG. 1 is a perspective view of a first preferred embodiment of the glare shield of this invention in functional configuration attached to a window or windshield;

FIG. 2 is a sectional view taken along line 2—2 of the glare shield illustrated in FIG. 1;

FIG. 3 is an enlarged sectional view of a preferred suction cup, plate and spacer pin configuration in the glare shield illustrated in FIGS. 1 and 2;

FIG. 4 is a top view of a second preferred embodiment of the glare shield of this invention; and FIG. 5 is a sectional view taken along line 5—5 of the glare shield illustrated in FIG. 4;

DESCRIPTION OF THE PREFERRED EMBODIMENTS

Referring initially to FIGS. 1-3 of the drawing, in a first preferred embodiment the glare shield of this invention is generally illustrated by reference numeral 1. The glare shield 1 is characterized by a shield assembly 2, which includes a flat, transparent or translucent, tinted plate 4, provided with a plate ridge 3 around the periphery thereof. A rubber or plastic suction cup 7 is attached to the plate 4 of the glare shield 1 near one edge of the plate 4. In a most preferred embodiment, the suction cup 7 is attached to the plate 4 by extending the cylindrical suction cup base 8 through an opening (not illustrated) provided in the plate 4. Base retainers 8a and a base groove 9, molded into the suction cup base 8, serve to retain the suction cup 7 in position on the plate 4 such that the flared cup member 10 may be attached to a smooth window 14, as illustrated in FIGS. 1-3. In another preferred embodiment of the invention the cup member 10 is fitted with a cup member tab 10a to facilitate breaking the suction in the cup member 10 and easily removing the suction cup 7 from the window 14. In another preferred embodiment of the invention a spacer pin 11 projects from the plate ridge 3 of the shield assembly 2 and contacts the cup member 10 to bias the plate 4 in close proximity to the window 14, as illustrated in FIG. 2. The spacer pin 11 acts as a fulcrum to prevent the plate 4 from pulling away from the window 14 when the glare shield 1 is positioned in the configuration illustrated in FIG. 2, since gravity has a tendency to displace the glare shield 1 from the window 14. A grip 12 is mounted on a grip post 13, the latter of which is, in turn, attached to the plate 4 near the opposite plate ridge 3 of the shield assembly. 2. This expedient facilitates gripping of the grip 12 and rotating the shield assembly 2 about the suction cup base 8 to reposition the glare shield 1 in a desired application without the necessity of removing the suction cup 7 from the window 14.

Referring now to FIGS. 4 and 5 of the drawings in a second preferred embodiment of the invention the plate 4 is shaped generally in the configuration of a hand having simulated fingers 5 and a simulated thumb 6 and no plate ridge 3. However, the suction cup 7 is mounted in the plate 4 in the same manner as the glare shield illustrated in FIGS. 1-3 and the grip 12 is spaced from the suction cup 7 to facilitate pivoting of the glare shield 1 about the suction cup base 8 to relocate the plate 4 in a desired position with respect to the window 14 without the necessity of removing the suction cup 7. As in the case of the glare shield illustrated in FIGS. 1-3, a spacer pin 11 is provided in the plate 4 for contacting the cup member 10 of the suction cup 7 and urging the plate 4 in close proximity along its entire length, to the window 14.

It will be appreciated by those skilled in the art that the glare shield of this invention can be utilized for a wide variety of purposes in reducing glare and blocking the direct rays of the sun, not only in the windows and windshield of a vehicle, but also on other light-reflective surfaces, such as a computer screen or the like. The glare shield is particularly well adapted for mounting on the windshield or car windows of a vehicle to block the sun under circumstances where the traveler is moving in any direction and the sun is sufficiently low on the horizon to project sunlight into the vehicle at angles not capable of being blocked by the vehicle sun visors. Compensation for change of direction by the vehicle and/or shifting of the sun with respect to the horizon by rotation of the earth is easily accomplished by rotation of the glare shield with respect to the suction cup element, as heretofore described. It will be further appreciated by those skilled in the art that the shape, thickness and size of the glare shield may be varied, depending upon the desires of the manufacturer and the extent of tinting of the plate depends upon the desired effectiveness in reducing glare and shielding the occupant(s) from glare and/or the direct rays of the sun.

Accordingly, while the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A glare shield for reducing the glare on a surface comprising a tinted plate; suction cup means rotatably carried by said tinted plate for removably engaging the surface; spacer pin means fixedly carried by said tinted plate and contacting said suction cup means for urging said tinted plate in close proximity to the surface; and grip means carried by said tinted plate in spaced relationship with respect to said suction cup means, whereby said tinted plate may be secured to the surface by said suction cup means and rotated about said suction cup means responsive to grasping of said grip means.

2. The glare shield of claim 1 further comprising a plate ridge bordering said tinted plate, said plate ridge projecting beyond the plane of said tinted plate.

3. The glare shield of claim 1 wherein said suction cup means is located near a first edge of said tinted plate and said grip means is located near a second edge of said tinted plate.

4. The glare shield of claim 3 further comprising:
(a) spacer pin means fixedly carried by said tinted plate and contacting said suction cup means for urging said tinted plate in close proximity to the surface; and
(b) a plate ridge bordering said tinted plate, said plate ridge projecting beyond the plane of said tinted plate.

5. The glare shield of claim 1 wherein said tinted plate further comprises a glare-resistant, translucent, injection-molded plate.

6. The glare shield of claim 5 wherein said suction cup means is located near a first edge of said tinted plate and said grip means is located near a second edge of said tinted plate.

7. The glare shield of claim 6 further comprising a plate ridge bordering said tinted plate, said plate ridge projecting beyond the plane of said tinted plate.

8. The glare shield of claim 5 further comprising a plate ridge bordering said tinted plate, said plate ridge projecting beyond the plane of said tinted plate.

9. A glare shield for removably mounting on a transparent surface and reducing the sunlight and glare through the transparent surface, comprising a tinted, translucent plate; a suction cup rotatably carried by said plate; a spacer pin projecting from said plate in fixed, substantially perpendicular relationship into contact with said suction cup for biasing said plate close to the transparent surface; and a grip carried by said plate in spaced relationship with respect to said suction cup, whereby said plate, said spacer pin and said grip ar rotatable about said suction cup for altering the position of said plate on the transparent surface.

10. The glare shield of claim 9 further comprising a plate ridge bordering said tinted plate, said plate ridge projecting beyond the plane of said tinted plate.

11. The glare shield of claim 9 wherein said suction cup is located near a first edge of said tinted plate and said grip is located near a second edge of said tinted plate.

12. The glare shield of claim 9 wherein said suction cup is located near a first edge of said tinted plate and said grip is located near a second edge of said tinted plate and further comprising a plate ridge bordering said tinted plate, said plate ridge projecting beyond the plane of said tinted plate.

13. A glare shield for removably mounting on a window and reducing the sunlight and glare through the window, comprising a tinted, translucent plate; a suction cup carried by said plate in rotatable relationship near a first edge of said plate; a spacer pin projecting from said plate in fixed, substantially perpendicular relationship into contact with said suction cup for biasing said plate close to the window; and a grip carried by said plate in spaced relationship with respect to said suction cup, whereby said plate, said spacer pin and said grip are selectively rotatable about said suction cup for altering the position of said plate on the window.

14. The glare shield of claim 13 further comprising a plate ridge bordering said tinted plate, said plate ridge projecting beyond the plane of said tinted plate.

15. The glare shield of claim 13 wherein said plate is injection molded from a plastic material.

16. The glare shield of claim 13 wherein said plate is injection molded from a plastic material and further comprising a plate ridge bordering said tinted plate, said plate ridge projecting beyond the plane of said tinted plate.

* * * * *